United States Patent [19]

Essers

[11] 4,039,800
[45] Aug. 2, 1977

[54] METHOD OF AND DEVICE FOR ARC WELDING

[75] Inventor: Wilhelmus Gerardus Essers, Eindhoven, Netherlands

[73] Assignee: U.S. Philips Corporation, New York, N.Y.

[21] Appl. No.: 559,820

[22] Filed: Mar. 19, 1975

[30] Foreign Application Priority Data

Mar. 27, 1974  Netherlands ............... 7404120

[51] Int. Cl.² .............................................. B23K 9/00
[52] U.S. Cl. ................................................. 219/121 P
[58] Field of Search ............... 219/121 P, 121 R, 73, 219/74, 75, 76, 137 R; 315/111.2; 313/231

[56] References Cited

U.S. PATENT DOCUMENTS

| 3,612,807 | 10/1971 | Liefkens et al. | 219/121 P |
|---|---|---|---|
| 3,632,952 | 1/1972 | Rotolico et al. | 219/76 |
| 3,644,782 | 2/1972 | Sheer et al. | 315/111 |
| 3,790,742 | 2/1974 | Auer | 219/121 P |
| 3,818,175 | 6/1974 | Essers et al. | 219/121 P |
| 3,830,997 | 8/1974 | Essers et al. | 219/76 |
| 3,832,513 | 8/1974 | Klasson | 219/75 |
| 3,891,824 | 6/1975 | Essers et al. | 219/121 P |

Primary Examiner—Bruce A. Reynolds
Assistant Examiner—Fred E. Bell
Attorney, Agent, or Firm—Frank R. Trifari; Rolf E. Schneider

[57] ABSTRACT

A method and device for plasma MIG-arc welding in which a MIG-arc is maintained between a welding wire and an auxiliary electrode which is independent of the workpiece; the auxiliary electrode typically being either the nozzle of the welding torch or an individual electrode between the nozzle and the workpiece.

10 Claims, 4 Drawing Figures

4,039,800

METHOD OF AND DEVICE FOR ARC WELDING

BACKGROUND OF THE INVENTION

This invention relates to an arc welding method in which a MIG-arc is maintained in an ionized gas flow which is conveyed through a nozzle in the direction of a workpiece, a consumable electrode serving as one of the electrodes of the MIG-arc.

Such a method is known from U.S. Pat. No. 3,612,807. In this known method the MIG-arc is maintained between the consumable electrode and a workpiece; the quantity of thermal energy supplied to the workpiece is coupled to the quantity of thermal energy required for melting the consumable electrode, the drawbacks of which being a large thermally influenced zone in the workpiece when high current strengths are used by the consumable electrode.

It is an object of the present invention to provide a method which does not exhibit said drawbacks, and in which the workpiece is influenced thermally only to a small extent by the current through the consumable electrode.

SUMMARY OF THE INVENTION

According to the invention the above-described object is achieved in that the MIG-arc is maintained between the consumable electrode and at least one auxiliary electrode which is independent of the workpiece. This method, in which the workpiece no longer serves as an electrode for the MIG-arc and in which the workpiece is hardly influenced thermally by the MIG-arc, permits the achievement of very high melting rates of the consumable electrode which are considerably higher than the melting rates achievable with the known methods. Therefore the method according to the invention is extremely suitable for cladding, facing and building-up.

The method according to the invention can generally be used in any welding process in which a current conveying consumable electrode is caused to melt in a thermally ionized gas flow; however, the method is particularly suitable for use in the plasma-MIG welding process which is already known from the said U.S. Pat. No. 3,612,807 and in which the gas flow is ionized by a plasma arc between a non-consumable electrode and the workpiece.

In a preferred embodiment of the method according to the invention, the MIG-arc is maintained between the consumable electrode and an auxiliary electrode and the workpiece. As a result of this, the MIG-arc and the plasma arc are clearly separated from each other, the MIG-arc mainly supplying the thermal energy for melting the consumable electrode, the plasma arc heating both the workpiece and the consumable electrode.

In another preferred embodiment of the method according to the invention, the MIG-arc is maintained between the consumable electrode and the nozzle serving as an auxiliary electrode. As a result of this it is possible to perform the method with a known welding torch, without it being necessary to provide the welding torch with a separate auxiliary electrode.

However, when the nozzle cannot be used as an auxiliary electrode, for example, because it already fulfills a different function, in a further preferred embodiment of the method according to the invention, the MIG-arc is maintained between the consumable electrode and an auxiliary electrode which is arranged between the nozzle and the workpiece.

The nozzle is used in another advantageous manner in a last preferred embodiment of the method according to the invention, in which the nozzle serves as a non-consumable electrode for the plasma arc.

For performing the method according to the invention, a welding torch is used which is known per se from the already mentioned U.S. Pat. No. 3,612,807, and which comprises a housing having a gas supply, a nozzle, a non-consumable electrode, a contact tube and means to connect the non-consumable electrode to a first supply source and to connect the contact tube to a second supply source; according to the invention said welding torch is characterized by an auxiliary electrode which is arranged downstream of the non-consumable electrode and has means for the connection to the second supply source.

Since in a preferred embodiment of the welding torch according to the invention, the nozzle is constructed as an auxiliary electrode, a compact construction of the welding torch is obtained. The nozzle may be constructed from tungsten or from copper which is water-cooled.

A cheap construction of the nozzle is possible in that, in another preferred embodiment of the welding torch according to the invention, the nozzle has at least one insert of a high-melting-point material. The insert serves as the actual auxiliary electrode so that the life of the nozzle is increased.

In a further preferred embodiment of the welding torch according to the invention, at least one auxiliary electrode is arranged downstream of the nozzle. In this case it is possible to use auxiliary electrodes of different design, for example, annular or rod-shaped. When rod-shaped auxiliary electrodes are used there exists in addition a freedom in the choice of the number of auxiliary electrodes and the arrangement thereof.

In a last preferred embodiment of the welding torch according to the invention, the nozzle is constructed as a non-consumable electrode and has means for the connection to the first supply source. The gas flow is ionized by a plasma arc which is maintained between the nozzle and the workpiece.

The invention will be described in greater detail with reference to the drawings:

DETAILED DESCRIPTION OF THE PREFERRED EMBODIMENTS

Figure 1:
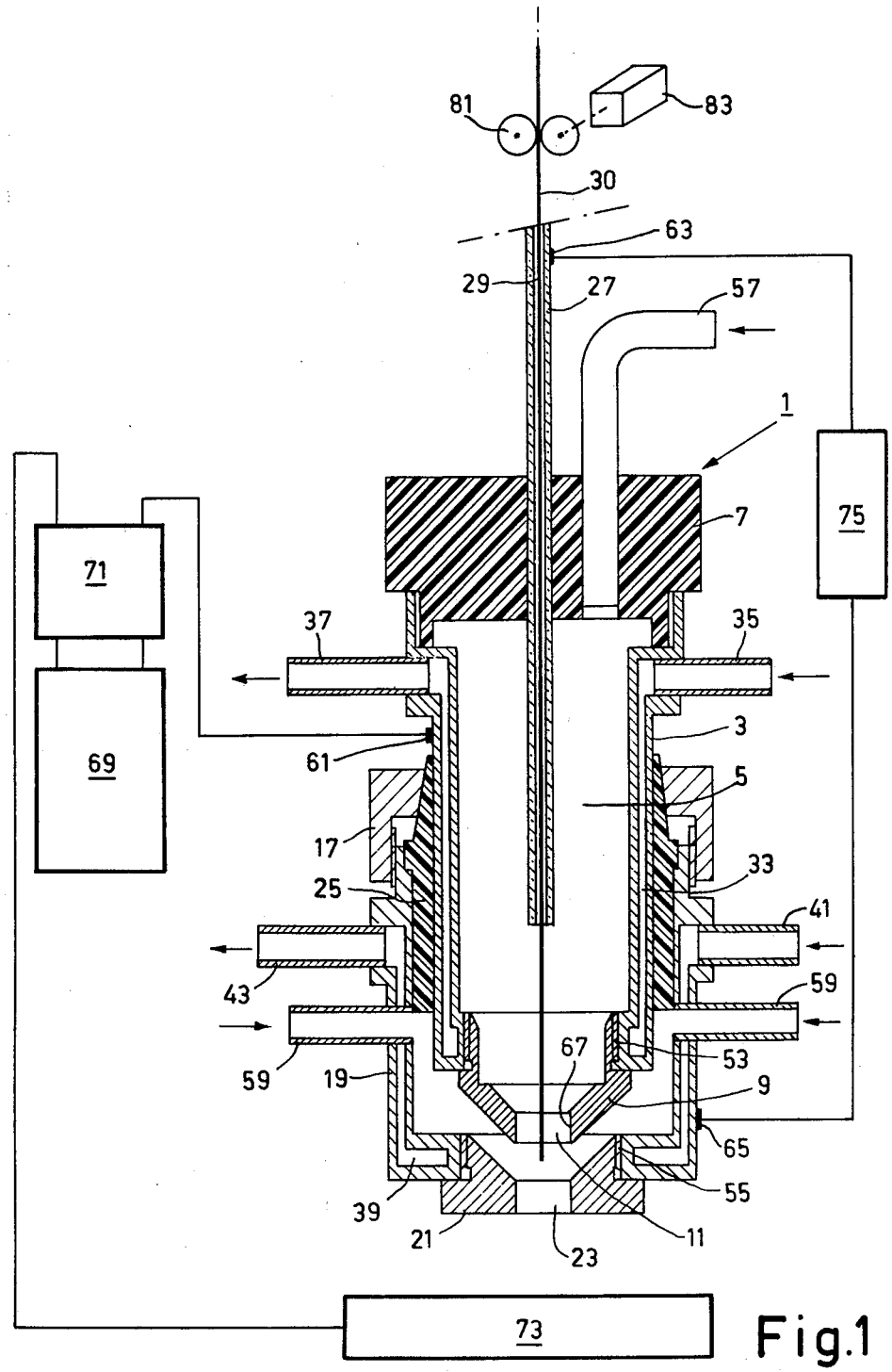
FIG. 1 shows in sectional elevation view a welding torch for carrying out the method according to the invention.

FIG. 1 shows a practical embodiment of the welding torch according to the invention. Said welding torch 1 comprises a housing 3 which has a chamber 5, the upper end of which is closed by a cap 7 of electrically insulating material. The lower end of the housing 3 comprises a nozzle 9 having an aperture 11. A cylindrical sleeve 19 with a non-consumable auxiliary electrode 21 having an orifice 23 is secured to the housing 3 by means of a ring nut 17. In the embodiment shown the auxiliary electrode 21 is annular.

The auxiliary electrode 21 may be constructed from tungsten but preferably from copper. The housing 3 and the sleeve 19 are electrically insulated from each other by means of an annular insulation element 25. A contact tube 27 which is secured in the cap 7 and the bore 29 of which serves to guide a welding wire 30, is arranged centrally in the chamber 5.

The housing 3 has a double-walled construction and comprises a cooling jacket 33 with cooling water connections 35 and 37 for cooling the nozzle 9. The sleeve 19 comprises a cooling jacket 39 with cooling water connections 41 and 43 for cooling the auxiliary electrode 21. The nozzle 9 is secured to the housing 3 by means of a screw connection 53. The auxiliary electrode 21 is connected to the sleeve 19 in a similar manner by means of a screw connection 55. This enables a simple assembly of the nozzle 9 and of the auxiliary electrode 21. The cap 7 furthermore has at least one supply tube 57 for supplying a plasma gas. The sleeve 19 may moreover be provided with one or several connections 59 for supplying a shielding gas.

In the present embodiment the nozzle 9 serves as a non-consumable electrode for the plasma arc and is connected, via a connection contact 61, to one of the terminals of a direct current supply source 69 via a high frequency generator 71. The other terminal of the supply source 69 is connected to a workpiece 73. The nozzle 9, like the auxiliary electrode 21, is constructed from tungsten or copper.

The welding wire 30 is connected, via a connection contact 63 on the contact tube 27, to one of the terminals of a second direct current supply source 75. The auxiliary electrode 21 is connected to the other terminal of the supply source 75 via a connection contact 65 on the sleeve 19.

The transport of the welding wire 30 is effected by means of driving rollers 81 which are driven by a motor 83 at controllable speed.

The operation of the welding torch is as follows: after connecting the nozzle 9, the auxiliary electrode 21, the contact tube 27 and the workpiece 73 to the direct current supply sources 69 and 75, a plasma gas is supplied via the supply tube 57. Typical plasma gases used in practice are inert gases, argon, helium, hydrogen and nitrogen, as well as mixtures thereof. A plasma arc is ignited between the nozzle 9 and the workpiece 73 by a high frequency discharge and is maintained by the supply source 69. The plasma arc acts on the inner circumference 67 of the nozzle 9. The plasma produced by the plasma arc flows at high velocity through the aperture 11 of the nozzle 9, through the orifice 23 of the auxiliary electrode 21 in the direction of the workpiece 73.

Via the bore 29 of the contact tube 27 the welding wire 30 is guided through the aperture 11 of the nozzle 9 in the direction of the workpiece 73; a MIG-arc is ignited and maintained between the welding wire 30 and the auxiliary electrode 21. Via the connections 59 in the sleeve 19, a shielding gas which may differ in composition from the plasma gas can be supplied in the usual manner so as to obtain an adequate protection of the melted material against oxidation. Shielding gases to be considered, in addition to inert gases, gases such as carbonic acid gas, gas mixtures of argon/oxgyen, argon/helium, argon/oxgyen/carbonic acid gas, as well as hydrogen and nitrogen.

Figure 2:
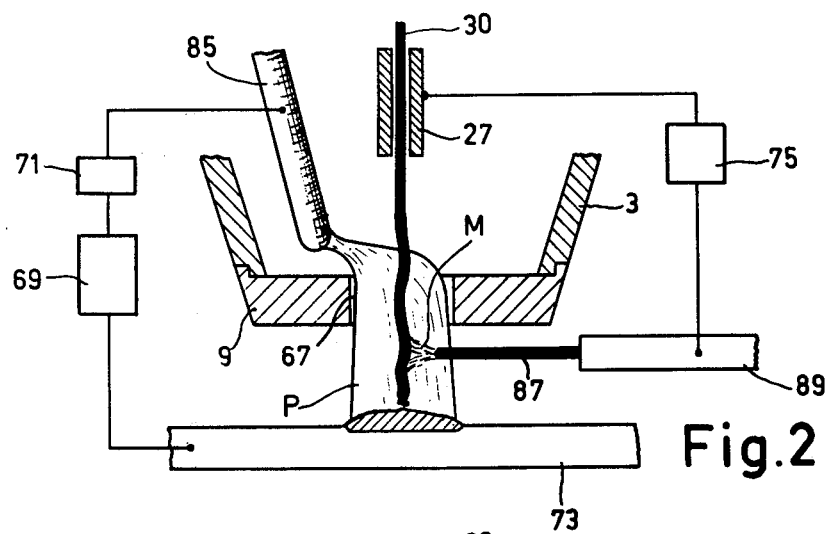
FIGS. 2, 3 and 4 are fragmentary elevation views in section showing further embodiments of the welding torch according to the invention.
Figure 3:
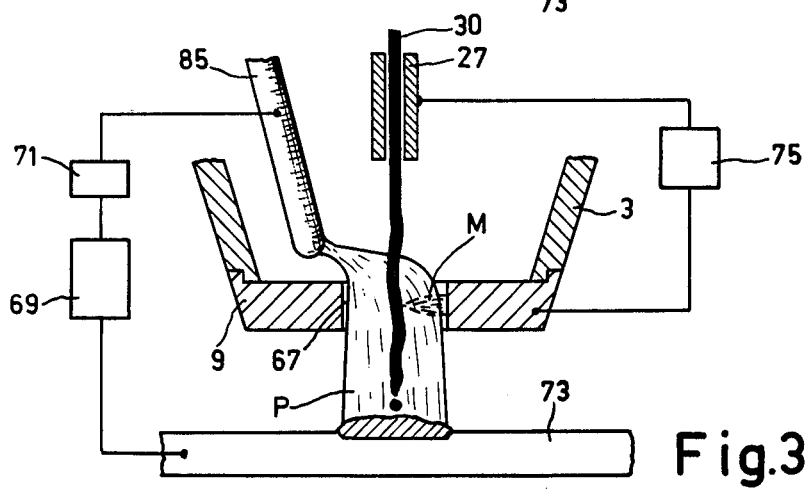
Figure 4:
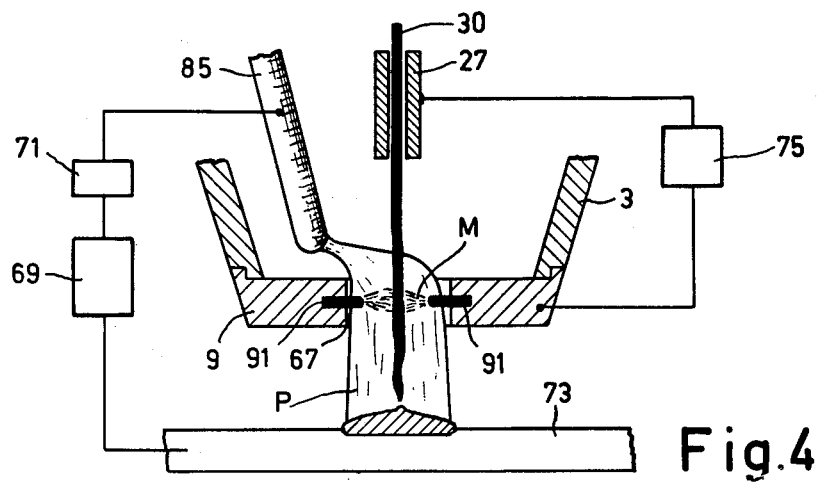

FIGS. 2, 3 and 4 show diagrammatically further embodiments of the welding torch according to the invention in which identical elements are referred to by the same reference numerals. In these three embodiments the nozzle 9 no longer serves as a non-consumable electrode for the plasma arc P. Instead of this, a rod-shaped electrode 85 of tungsten or water-cooled copper is arranged in the housing 3 and is connected to the supply source 69. The plasma arc P is now maintained between the rod electrode 85 and the workpiece 73.

In the embodiment shown in FIG. 2 the auxiliary electrode for the MIG-arc M is constructed as a rod-shaped tungsten electrode 87 which is connected to the supply source 75 via an electrode holder 89.

In the embodiment shown in FIG. 3 the nozzle 9 serves as an auxiliary electrode and is connected to the supply source 75, the MIG-arc M being maintained between the welding wire 30 and the inner circumference 67 of the nozzle 9.

A longer life and a smaller thermal load of the nozzle 9 is obtained in the embodiment shown in FIG. 4. In this case the nozzle 9 also serves as an auxiliary electrode for the MIG-arc, in which, however, the nozzle has at least one insert 91 of a high-melting-point material, for example, tungsten. Said insert constitutes the actual auxiliary electrode for the MIG-arc. Preferably two inserts 91 are arranged in the nozzle diametrically opposite to each other; the advantage of the symmetric arrangement of the inserts is that the separate MIG-arcs neutralize the influences of each other's magnetic field.

Since in the method according to the invention, the MIG-arc between the welding wire and the auxiliary electrode is independent of the workpiece and of the plasma arc, the workpiece is hardly influenced thermally by the MIG-arc. Experiments have demonstrated that the method is extremely suitable for welding-on materials at very high melting rates. Stainless steel is deposited without sputters on a workpiece at a rate varying from 20 to 40 kg per hour, dependent on the embodiment used and the current parameters.

The method may be carried out both with alternating current and with direct current, with positive or negative polarities of the welding wire and of the non-consumable electrode for the plasma arc.

The Figure shows two separate supply sources for the plasma arc and the MIG-arc. Preferably, the two supply sources form part of a common control unit in which, however, both supply sources can be controlled independently of each other.

What is claimed is :

1. A method of plasma -MIG welding, which comprises establishing a plasma arc between a first non-consumable electrode and a workpiece, feeding a consumable electrode through said plasma arc toward said workpiece, and establishing a MIG-arc between said consumable electrode and an auxiliary non-consumable electrode electrically insulated from said workpiece.

2. A method according to claim 1, in which said auxiliary non-consumable electrode is positioned between said first non-consumable electrode and said workpiece.

3. A method according to claim 1, in which said first non-consumable electrode is provided by the nozzle of a welding torch.

4. A method according to claim 3, in which said auxiliary non-consumable electrode is positioned between said nozzle and said workpiece.

5. A plasma -MIG welding apparatus, which comprises a welding torch provided with a first circuit means including said first non-consumable electrode, a first power supply and a workpiece for establishing a plasma arc between said first non-consumable electrode and the workpiece, means for feeding a consumable electrode through said plasma arc toward said workpiece, an auxiliary non-consumable electrode electrically insulatable from said workpiece, and second circuit means including said consumable electrode, said auxiliary non-consumable electrode and a second power supply for establishing a MIG-arc between said consumable electrode and said auxiliary non-consumable electrode.

6. Apparatus according to claim 5, in which said welding torch includes a nozzle electrically insulated from said torch, and comprising said auxiliary non-consumable electrode.

7. Apparatus according to claim 6, in which said nozzle includes at least one insert of high-melting-point material.

8. Apparatus according to claim 5, in which said welding torch includes a nozzle, and said auxiliary non-consumable electrode is positioned downstream of said nozzle, between said nozzle and the workpiece.

9. Apparatus according to claim 8, in which said nozzle comprises said first non-consumable electrode.

10. Apparatus according to claim 5, in which said auxiliary non-consumable electrode is positioned between said first non-consumable electrode and the workpiece.

* * * * *

UNITED STATES PATENT AND TRADEMARK OFFICE
CERTIFICATE OF CORRECTION

PATENT NO. : 4,039,800
DATED : August 2, 1977
INVENTOR(S) : WILHELMUS GERARDUS ESSERS It is certified that error appears in the above-identified patent and that said Letters Patent are hereby corrected as shown below:

Column 1, line 51, after "auxiliary electrode" insert

--which is arranged between the non-consumable electrode--

Signed and Sealed this

Twentieth Day of December 1977

[SEAL]

Attest:

RUTH C. MASON
Attesting Officer

LUTRELLE F. PARKER
Acting Commissioner of Patents and Trademarks